(12) United States Patent
Sievers-Engler

(10) Patent No.: US 12,194,463 B2
(45) Date of Patent: Jan. 14, 2025

(54) AUTOMATIC SAMPLE CONCENTRATING UNIT

(71) Applicant: Roche Diagnostics Operations, Inc., Indianapolis, IN (US)

(72) Inventor: Adrian Sievers-Engler, Muensingen (DE)

(73) Assignee: Roche Diagnostics Operations, Inc., Indianapolis, IN (US)

(*) Notice: Subject to any disclaimer, the term of this patent is extended or adjusted under 35 U.S.C. 154(b) by 651 days.

(21) Appl. No.: 17/304,344

(22) Filed: Jun. 18, 2021

(65) Prior Publication Data

US 2021/0402394 A1    Dec. 30, 2021

(30) Foreign Application Priority Data

Jun. 30, 2020    (EP) .................................. 20183299

(51) Int. Cl.
*B01L 3/00* (2006.01)
*G01N 1/40* (2006.01)
*G01N 35/02* (2006.01)

(52) U.S. Cl.
CPC ..... *B01L 3/502715* (2013.01); *B01L 3/50273* (2013.01); *G01N 35/025* (2013.01);
(Continued)

(58) Field of Classification Search
CPC ........... B01L 3/502715; B01L 3/50273; B01L 2300/049; B01L 2300/14; B01L 2400/049; B01L 2400/06; G01N 35/025; G01N 2001/4027; G01N 1/4022; B01D 1/0017; B01D 1/0094; B01D 1/14; B01D 3/06; B01D 3/106
See application file for complete search history.

(56) References Cited

U.S. PATENT DOCUMENTS 4,465,554 A    8/1984    Glass
5,897,838 A    4/1999    Kempe
(Continued)

FOREIGN PATENT DOCUMENTS

CN    207472649 U    6/2018
CN    208026540 U    10/2018
(Continued)

OTHER PUBLICATIONS

European Search Report issued Dec. 4, 2020, in Application No. 20183299.5, 2 pp.
(Continued)

*Primary Examiner* — Jill A Warden
*Assistant Examiner* — John McGuirk
(74) *Attorney, Agent, or Firm* — Taft Stettinius & Hollister LLP

(57) ABSTRACT

A sample concentrating unit and a sample concentrating method are described, which enable fast, precise and reproducible analyte concentration in a sample by evaporation of sample solvent. A specifically directed gas stream in cooperation with a vacuum generated in the sample concentrating unit keeps the sample at boiling point during the entire evaporation procedure while reducing analyte loss and risk of cross-contamination. The fully automated sample concentrating unit is designed to be integrated into an in-vitro diagnostic analyzer.

15 Claims, 5 Drawing Sheets

(52) U.S. Cl.
CPC ..... *B01L 2300/049* (2013.01); *B01L 2300/14* (2013.01); *B01L 2400/049* (2013.01); *B01L 2400/06* (2013.01); *G01N 2001/4027* (2013.01)

(56) References Cited

U.S. PATENT DOCUMENTS

| | | |
|---|---|---|
| 2007/0193871 A1 | 8/2007 | Wiseman et al. |
| 2009/0218051 A1 | 9/2009 | Cereceda Balic et al. |
| 2019/0291021 A1* | 9/2019 | Sutherland ............... B01D 3/40 |
| 2020/0209124 A1* | 7/2020 | Fornells Vernet ..... G01N 30/12 |

FOREIGN PATENT DOCUMENTS

| | | |
|---|---|---|
| GB | 1427034 A | 3/1976 |
| JP | 2001-153769 A | 6/2001 |
| WO | 2003/051516 A1 | 6/2003 |
| WO | 2018/209408 A1 | 11/2018 |

OTHER PUBLICATIONS

Chinese Search Report; China National Intellectual Property Administration; Chinese Patent Application No. 2021107296158; Jun. 26, 2024; 2 pages.

Search Report; National Intellectual Property Administration of People's Republic of China; Chinese Patent Application No. 2021107296158; Nov. 20, 2024; 2 pages.

\* cited by examiner

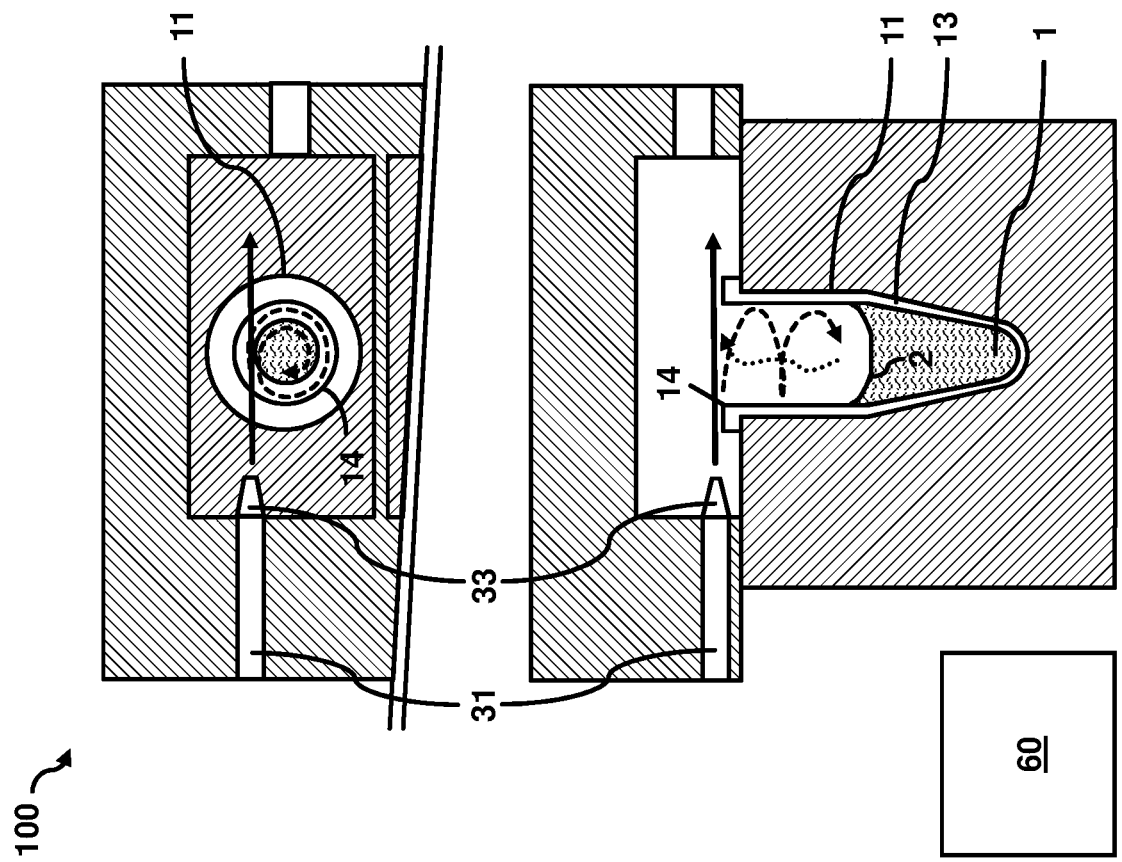

AUTOMATIC SAMPLE CONCENTRATING UNIT

CROSS-REFERENCE TO RELATED APPLICATIONS

This application claims priority to European Patent Application No. 20183299.5, filed 30 Jun. 2020, the disclosure of which is hereby incorporated by reference in its entirety.

TECHNICAL FIELD

The present disclosure relates to an automatic sample concentrating unit and a method for automatically concentrating analytes in a sample for further analysis in an in-vitro diagnostic analyzer, in particular by evaporating sample solvent from the sample by applying a vacuum and a gas stream.

BACKGROUND

It is of growing interest to implement mass spectrometry (MS) and more specifically liquid chromatography coupled to mass spectrometry (LC/MS) in the in-vitro diagnostic laboratory environment. Sample preparation plays a crucial role in LC/MS analysis. In some cases, it may be advantageous to exchange sample solvent and/or concentrate analytes present in a sample before further sample treatment, e.g., subsequent resuspension, and/or further analysis, in particular before injection into a liquid chromatography column. Active sample solvent evaporation can be used for this purpose. Commercially available evaporation devices typically require observation and manual intervention and are designed for handling a small number of samples in low-throughput laboratory environments. However, when it comes to a fully automated environment and processing of large numbers of samples, such as in an in-vitro diagnostic laboratory, commercially available evaporation devices are not suitable. In such an environment, any manual interventions can have a significant impact on labor costs and might further lead to compromised results due to a "human factor" in the process.

In order to enable a fully automated LC/MS workflow for high-throughput in-vitro diagnostic laboratories, it is important to also integrate and automate the sample preparation procedure as much as possible. In particular, in case of a random access approach, it may be required to quickly adapt the operational conditions for any given test. In a random access approach samples are inserted into the analyzer in random order and are also processed in this way, as opposed to sample processing in batches. Random access enables higher throughput, high flexibility, and longer walk-away times. Consequently, any integrated sample preparation procedure and its underlying sample preparation units need to meet the same requirements of quick adaptation and flexibility.

Evaporation devices often use gas streams (also referred to as jet-streams or blow-down) directed orthogonally to the surface of the sample to support the evaporation process. U.S. Pat. No. 4,465,554 discloses an apparatus for evaporation that applies a heated jet stream orthogonally to the surface of a sample. The jet stream thereby brings the sample into a temperature range where it starts evaporating. U.S. Pat. No. 5,897,838 discloses an evaporation apparatus that combines vacuum and blow-down to carry away gaseous solvents. However, applying a gas stream orthogonally to a sample surface bears the risk that the sample and thus the analyte of interest might be splashed to the side walls of the sample vessel or even outside of the sample vessel thereby losing the analyte of interest and risking cross-contamination.

Other commercially available evaporation devices agitate the sample by vortexing, thereby increasing the exposed sample surface area in order to support sample solvent evaporation. Or they rotate the samples in a rotary evaporator or a centrifuge to remove solvent and to concentrate the analytes of interest. These devices, i.e., vortexes, rotary evaporators and centrifugal evaporators, are however bulky, complex, and require high maintenance, which makes them inconvenient to integrate into an automated in-vitro diagnostic system.

SUMMARY

It is against the above background that the embodiments of the present disclosure provide certain unobvious advantages and advancements over the prior art. In particular, a need was recognized for improvements in a fully automated sample concentration unit as part of an automated sample preparation procedure integrated in a high-throughput in-vitro diagnostic analyzer.

In particular, a sample concentrating unit and a sample concentrating method are disclosed that enable a fully automated, fast, precise, reliable and reproducible sample concentration as part of a sample preparation procedure in an in-vitro diagnostic analyzer. The sample concentrating unit and sample concentrating method disclosed herein are particularly suitable for integration in an automated LC/MS in-vitro diagnostic system, however they can be implemented in any in-vitro diagnostic system which can benefit from an automated sample concentration procedure.

Although the embodiments of the present disclosure are not limited to specific advantages or functionality, it is noted that the present disclosure allows for a sample concentrating unit and a sample concentrating method that enable faster, more precise and reproducible analyte concentration in a sample by evaporating sample solvent in a controlled manner. This is achieved by combining a specifically directed jet-stream of gas with a vacuum generated in the sample concentrating unit and keeping the sample at boiling point during the entire evaporation procedure via a feedback-controlled process.

Another advantage of the sample concentrating unit and method herein disclosed is that it reduces analyte loss and risk of cross-contamination by eliminating the splashing of sample material to the side walls or even to the outside of the sample containing vessel. In consequence, this ensures higher sensitivity and more reliable analytical results.

Another advantage of the sample concentrating unit and method herein disclosed is the compact design and fully automated implementation, thereby making it deployable in an automated in-vitro diagnostic analyzer. It has a mechanical construction that is less maintenance-intensive and therefore makes it more reliable while at the same time extending its lifetime. Also, it requires less amount of space which is of advantage when deployed in an automated in-vitro diagnostic analyzer. It further eliminates the "human factor" from the sample preparation procedure, leading to more reliable results.

In accordance with one embodiment of the present disclosure, a sample concentrating unit for concentrating analytes in a sample by evaporation of sample solvent is provided comprising a sample receiving element with at least one sample receiving position having an opening for receiving a sample or an open sample vessel containing a sample and a cover element for sealing the at least one sample receiving position. The cover element and the at least one sample receiving position and/or the sample vessel are designed to leave a cavity between the cover element and an upper sample surface. The sample concentrating unit further comprises a cavity inlet connected to a gas source via a gas channel and comprising a gas-stream directing nozzle for directing a stream of gas into the cavity, and a cavity outlet connected to a vacuum pump for generating negative pressure in the cavity. The gas-stream directing nozzle is arranged such that the gas stream enters the cavity in a direction parallel to a sample surface tangent plane thereby cooperating with the vacuum pump to transport evaporated sample solvent out of the cavity through the cavity outlet. The sample concentrating unit further comprises a controller configured to control the vacuum pump to automatically adjust the negative pressure in the cavity in order to maintain the sample at boiling point until a predetermined level of solvent evaporation is reached.

In accordance with another embodiment of the present disclosure, an automatic method of concentrating analytes in a sample by evaporation of sample solvent is provided comprising placing at least one sample or open sample vessel containing a sample in at least one sample receiving position of a sample receiving element; sealing the at least one sample receiving position by a cover element, wherein the cover element and the at least one sample receiving position and/or the sample vessel are designed to leave a cavity between the cover element and an upper sample surface; generating negative pressure in the cavity by a vacuum pump connected to a cavity outlet; introducing a gas stream into the cavity through a cavity inlet connected to a gas source via a gas channel, the cavity inlet comprising a gas-stream directing nozzle, wherein the gas-stream directing nozzle is arranged such that the generated gas stream is directed into the cavity in a direction parallel to a sample surface tangent plane thereby cooperating with the vacuum pump to transport evaporated sample solvent out of the cavity through the cavity outlet; and controlling the sample concentrating unit to maintain the sample at boiling point until a predetermined level of solvent evaporation is reached.

These and other features and advantages of the embodiments of the preset disclosure will be more fully understood from the following detailed description taken together with the accompanying claims. It is noted that the scope of the claims is defined by the recitations therein and not by the specific discussions of features and advantages set forth in the present description.

BRIEF DESCRIPTION OF THE DRAWINGS

The following detailed description of the embodiments of the present description can be best understood when read in conjunction with the following drawings, where like structure is indicated with like reference numerals and in which:

FIGS. 5a and 5b schematically show further details of a sample concentrating unit in a cross-section view from above (FIG. 5a) and the same sample concentrating unit in a lateral cross-section view (FIG. 5b).

Figure 1:
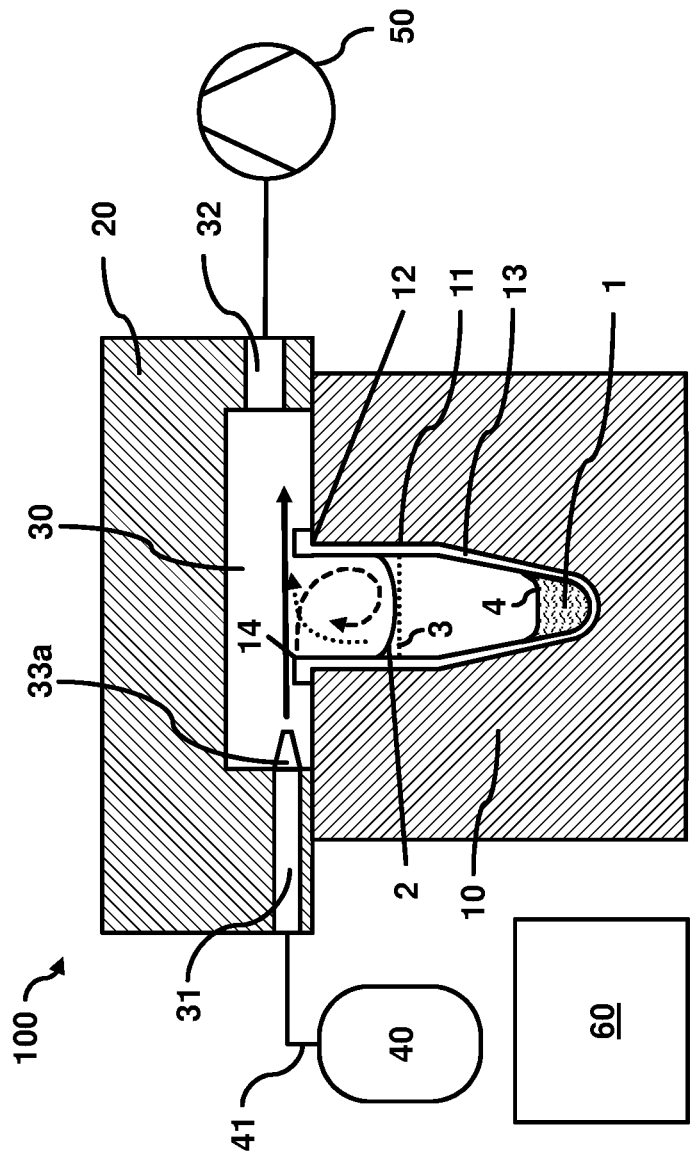
FIG. 1 schematically shows a sample concentrating unit in a lateral cross-section view.

Skilled artisans appreciate that elements in the figures are illustrated for simplicity and clarity and have not necessarily been drawn to scale. For example, the dimensions of some of the elements in the figures may be exaggerated relative to other elements to help improve understanding of the embodiments of the present disclosure.

DETAILED DESCRIPTION

The term "sample" as used herein refers to a biological material suspected of containing one or more analytes whose detection—qualitative and/or quantitative—may be associated to a medical condition. A sample may also be analyzed regarding its physical properties (e.g., pH, color, turbidity, viscosity) to detect certain medical conditions. It can be derived from any biological source, such as a physiological fluid, including, blood, saliva, sputum, ocular lens fluid, cerebral spinal fluid (CSF), sweat, urine, milk, ascites fluid, mucous, synovial fluid, peritoneal fluid, pleural fluid, amniotic fluid, tissue, bone marrow, feces, cells or the like. The sample can be pretreated prior to use, such as preparing plasma from blood, diluting viscous fluids, lysis or the like. Methods of treatment can involve filtration, centrifugation, distillation, concentration, inactivation of interfering components, and the addition of reagents. A sample may be used directly as obtained from the source or following a pretreatment and/or sample preparation workflow to modify the character of the sample, e.g., after adding an internal standard, after being diluted with another solution or after having being mixed with reagents, e.g., to enable carrying out one or more in-vitro diagnostic tests. The term "sample" as used herein is therefore not necessarily used to indicate the original sample but may also relate to a sample which has already been processed (pipetted, diluted, mixed with reagents, enriched, purified, amplified, etc.). The term "sample" may further refer to liquids that contain known levels of analytes and are used to confirm the diagnostic device operability, e.g., quality controls and/or calibrators.

The term "analyte" as used herein refers to any substance or compound in a sample that an analytical method or test seeks to detect, e.g., chemical elements like ions, or molecules like peptides, proteins, RNA, DNA, fatty acids, carbohydrates and the like. In general, the information on presence, absence and/or concentration of an analyte in a sample may give an indication on the health status of a patient and thus may be used to derive a diagnosis, or it may be used to determine and regulate a therapeutic regimen. Examples of analytes of interest in the context of this disclosure are vitamin D, drugs of abuse, therapeutic drugs, hormones, and metabolites in general. The list is however not exhaustive.

In order to separate and/or concentrate analytes of interest in a sample before analysis, e.g., before injection into a liquid chromatography column, the sample may be subjected to an automated sample treatment or sample preparation procedure, which may involve the use of solvents. Thus, a sample or a sample component after treatment may be mixed with a sample solvent chosen based on the analyte of interest's solubility properties and its compatibility with downstream analytical methods (e.g., liquid chromatography, ionization techniques). "Sample solvent" as used in this disclosure may refer to any liquid that has the property of dissolving compounds to form a solution, e.g., water, acetonitrile, methanol, ethanol, propanol, isopropanol and the like. A sample solvent may contain additives, such as acetic acid, formic acid, ammonium hydroxide, ammonium formate, ammonium acetate, non-volatile salts, etc. Further, sample solvents may be mixtures of more than one solvent, e.g., water with methanol. However, the term sample solvent may also refer to the liquid solvent component of the original sample in which analytes are dissolved. For example, a blood sample naturally contains a certain amount of water (e.g., plasma has a water content of approx. 90%; serum has a water content of >90%).

The term "sample vessel" is used herein to indicate a container comprising a body with an inner space, the inner space being adapted to receive liquids, and an opening confined by a rim, through which liquids can be introduced into the inner space. A sample vessel may be a sample collection test tube also called primary tube, which is used to receive a sample from a patient and to transport the sample contained therein to an analytical laboratory for an in-vitro diagnostic test. Primary tubes are usually closed by tube caps. However, these caps can be removed automatically on many available in-vitro diagnostic analyzers before further processing. In particular, the term "sample vessel" refers to a secondary tube, which may be used to receive at least part of a sample from a primary tube. A sample vessel may further refer to a reaction vessel, e.g., to enable a reaction between one or more samples with one or more reagents and/or to enable analysis of a liquid contained therein. A sample vessel may further comprise a multitude of receptacles to receive different samples or multiple aliquots from the same sample, e.g., a multi-well plate, to enable higher throughput or multiplexing.

A "unit" as used herein refers to a functional entity that is dedicated to executing a specific set of operations. Accordingly, the unit is constructed in a way to optimally perform these operations. The function can be analytical but can also be pre-analytical or post-analytical, or it can be an auxiliary function to any of the pre-analytical function, analytical function or post-analytical function. It may be operated autonomously as a stand-alone apparatus, in cooperation with other units or as a sub-unit of a more complex apparatus. In the field of in-vitro diagnostics, a unit may therefore be a standalone in-vitro diagnostic analyzer or in-vitro diagnostic device, it may be connected to or work in cooperation with one or more in-vitro diagnostic analyzer(s)/device(s), or it may be entirely integrated into an in-vitro diagnostic analyzer or in-vitro diagnostic device. Examples of units are, e.g., a conveyor, a gripper, a centrifuge, a pipetting unit, an incubation unit, an analytical (measurement) unit, a sample concentrating unit, a result displaying unit, etc. Hence, a "sample concentrating unit" is a functional entity designed to perform the operation of concentrating a sample and consequently the analytes of interest dissolved therein by, e.g., evaporating a predetermined volume of said sample. "Concentrating" in the context of this disclosure refers to the process of bringing an analyte or compound that is dissolved in a solvent at a certain concentration to a state of higher concentration, e.g., by removing solvent.

Depending on the unit's function, it might be beneficial to hold a sample or a sample vessel for a certain amount of time, e.g., when adding reagent, during incubation, during sample concentration, etc. Such functional units therefore comprise sample receiving elements with one or more sample receiving positions. Sample receiving elements may comprise of thermally conductive material, e.g., metal, or be designed to hold thermally conductive materials, e.g., water or oil, to enable heat exchange between the sample receiving positions and their surroundings. Or, they may alternatively comprise of insulating material to prevent heat exchange between the sample receiving positions and their surroundings. The sample receiving positions typically comprise openings (e.g., recesses, apertures, passages, etc.) confined by rims, in which samples can be directly inserted or in which vessels containing samples can be placed. Sample receiving positions are usually designed to hold samples or sample vessels stably and in a specific orientation to avoid tilting and spilling of sample material and to enable potential interaction with other units, e.g., a pipetting unit or a gripper, etc. If vessels from different manufacturers need to be processed or if manufacturing tolerances need to be compensated, sample receiving positions may comprise additional components with properties that allow a certain adaption in size yet maintain the ability to hold a sample vessel stable, e.g., coil springs, sponge rubber, Styrofoam™ inserts, etc.

The "upper sample surface" as used herein refers to the surface area of the sample that is not in direct contact with any vessel wall or any wall of the opening of the sample receiving position, independent of the orientation of the sample receiving position. The upper sample surface is however in direct contact with the gas phase surrounding the sample vessel or the sample receiving position. Depending on the surface tension of the sample, the upper sample surface may form a meniscus.

An "in-vitro diagnostic analyzer" as used herein refers to an automated analytical apparatus configured to obtaining an analytical measurement value from samples. The in-vitro diagnostic analyzer may have different configurations according to the need and/or according to the desired laboratory workflow. It can be operated as a stand-alone instrument or in conjunction with one or more other in-vitro diagnostic analyzers and/or in-vitro diagnostic devices. "In-vitro diagnostic device" as used herein is a broader term and also includes—besides the in-vitro diagnostic analyzers—any pre-analytical or post-analytical devices or combinations thereof.

"Evaporation" as used herein refers to the phase transition from liquid to vapor that occurs on the surface of a liquid. When molecules at the surface of a liquid acquire enough kinetic energy they transfer from the liquid phase to the gas phase. Therefore, they have to overcome liquid-phase intermolecular forces or surface tension as well as the pressure exerted by the surrounding gas phase. The temperature at which a given liquid's vapor pressure equals the pressure surrounding the liquid is referred to as the "boiling point". Thus, the boiling point depends on the temperature of the liquid and the surrounding pressure of the gas phase. Any change in temperature and/or pressure results in a change of boiling point (boiling point curve). For example, lowering the surrounding gas pressure decreases the boiling point of the liquid. The boiling point and boiling point curve vary between different liquids. The term "at boiling point" as used in this disclosure, refers to bringing the sample as close to the boiling point as possible while avoiding superheating. For example, the sample may be at a temperature slightly below the boiling point for the evaporation procedure to be conducted. Furthermore, in a mixture of solvents with different evaporation properties, the boiling point may change over time. This can occur when one solvent evaporates sooner than other solvent(s), thereby shifting the volume ratio from one solvent to the other(s). Also, when solvent evaporates, solutes in the sample become more concentrated, which has an effect on liquid-phase intermolecular forces or surface tension and thus on the boiling point. The surface tension and thus the boiling point may increase or decrease depending on the type of solvent and on the type of solutes directly affecting the amount of energy required to enable molecules to transfer from the liquid phase to the gas phase. It is further known that evaporation proceeds more quickly the bigger the surface between liquid and its surrounding is and when evaporated gas is removed above the surface of the liquid. Also, when molecules evaporate, the remaining molecules have lower average kinetic energy resulting in a decrease of liquid temperature, a phenomenon referred to as evaporative cooling. All these effects have to be taken into account to accurately control the evaporation of a predetermined volume of a given liquid. The "evaporation of sample solvent" as used in this disclosure is not restricted to the evaporation of the solvent that had been added to the sample prior to the evaporation procedure, but may also refer to the liquid component of the original sample. In fact, once a sample has been mixed with a sample solvent, the liquid phase of the sample homogeneously mixes with the sample solvent so that no discrimination can be made between the liquid component of the original sample and the added sample solvent. For example, if a plasma sample with a water content of approx. 90% is mixed with a sample solvent water, then both the sample solvent as well as the liquid component of the original sample will be evaporated during an evaporation process.

A "cover element" as used herein is an element for sealing the at least one sample receiving position hermetically, i.e., it prevents the exchange of gas or liquid between the sample receiving position with the outside of the sample concentrating unit. In particular, it prevents the uncontrolled exchange of gas or liquid, which means that the cover element may comprise inlets and outlets for enabling controlled gas influx to the sample receiving position and efflux therefrom. At the connection areas to its counterpart, the cover element may comprise additional materials with sealing features to improve sealing abilities, e.g., rubber, PTFE, epoxy resins, etc. The cover element may be removable from the sample receiving position to enable access to the sample receiving position by other units (e.g., pipetting unit, vessel gripper, etc.). The sample receiving position can therefore be referred to as being in an open state, i.e., the cover element is removed from the sample receiving position, or in a closed state, i.e., the cover element is sealing the sample receiving position. Alternatively, the sample receiving position may be accessible via a sample inlet and sample outlet channel and the cover element may therefore be fixed. Further, the cover element may be temperature controlled to adapt the cover element's temperature to the temperature of the evaporated sample solvent in order to prevent it from condensing. The cover element and the sample receiving position are designed to provide a hollow space between the cover element and the upper sample surface of the sample in the sample receiving position.

This hollow space is referred to as "cavity" in this disclosure. If the sample concentrating unit is designed in a way that the cover element is flush with the rim of the sample receiving position or with the rim of the sample vessel, the cavity may be confined to the hollow space between the sample surface and the rim of the sample receiving position or to the hollow space between the sample surface and the rim of the sample vessel, respectively. Alternatively, the cavity may extend above the rim of the sample receiving position if the cover element is designed accordingly. In case of multiple sample receiving positions, the design may provide a cavity for each sample receiving position, respectively, or it may provide one single cavity shared by multiple sample receiving positions, or it may provide a combination of single and shared cavities. The cover element in combination with the sample receiving position is designed to provide a cavity structure that supports solvent evaporation. For example, the cavity structure may be funnel-shaped with the tapered end transitioning into a cavity outlet. The funnel shaped cavity may thereby be tapering in a vertical direction above the sample receiving position. Alternatively, the cavity structure may be bell-shaped or cylindrical or cuboid, or combinations thereof. Further, the cavity may be temperature controlled to regulate the temperature of the gas inside the cavity.

The "cavity inlet" as referred to in this disclosure is an opening enabling a controlled influx of gas into the cavity. The cavity inlet may be formed in the cover element or it may be formed in the sample receiving element or it may be formed partially by both elements. Thus, one end of the cavity inlet leads into the cavity, the other end of the cavity inlet is connected to a "gas source" via a "gas channel" outside of the cavity. The sample concentrating unit may comprise additional auxiliary cavity inlets to enable gas influx into the cavity at different positions. The "gas source" may thereby provide a mixture of gases, e.g., the air surrounding the sample concentrating unit, or it may provide a specific kind of gas, e.g., nitrogen. Typically, the provided gas is inert to avoid any reactions with the sample or with the analyte of interest. The gas source may provide the gas passively or actively. For example, in a passive setting, gas is passively drawn through the gas channel and the cavity inlet into the cavity by the negative pressure being created inside the cavity by a vacuum pump. In an active setting on the other hand, the gas source may be a gas container operatively coupled to a pump, wherein the pump actively transports the gas from the gas container through the gas channel to the cavity inlet. The "gas channel" in the context of this disclosure can be a tube-shaped element or other fluidic structure operatively connecting the gas source to the cavity inlet, wherein the gas channel is made of a material or is enforced with a material stable enough to avoid a collapse of the gas channel when negative pressure is generated inside the cavity. The gas channel may further comprise compartments for mixing of gases from different gas sources or for temperature regulation of the gas inside the gas channel or for controlling the flow of the gas.

The sample concentrating unit further comprises a "gas-stream directing nozzle" installed at the transition point where the cavity inlet leads into the cavity. The gas-stream directing nozzle may have a cylindrical shape, i.e., the same cross-sectional area over its entire length, wherein the cross-sectional area is the same size or smaller than the cross-sectional area of the gas channel and the cavity inlet. For example, the cross-sectional area may have a width of 1 mm or smaller. Alternatively, the gas-stream directing nozzle may be tapered towards the cavity. The gas-stream directing nozzle enables focusing of the gas stream, resulting in a high entry speed of the gas stream into the cavity. The gas stream entry speed is ideally in a range that ensures turbulence free flow of gas into the cavity (laminar flow) and enables the entering gas stream to advance across the opening of the sample receiving position up to the part of the rim that is positioned furthest away from the gas-stream directing nozzle or beyond. Further, the gas-stream directing nozzle enables to direct the entering gas stream at a desired angle or orientation. In particular, the gas stream is directed into the cavity in a direction parallel to a sample surface tangent plane. The term "sample surface tangent plane" is used in this disclosure, because the sample surface is likely to form a concave meniscus in the sample receiving position or in the sample vessel. The sample surface tangent plane thereby refers to the plane that approximates the lowest point of the meniscus (or the highest, in case of a convex meniscus). The direction of the gas stream may however change inside the cavity and deviate from streaming in parallel to the sample surface tangent plane. This might occur due to the cavity design, e.g., if the cavity outlet is located orthogonally with respect to the cavity inlet, or due to emerging turbulences caused by obstructions inside the cavity. Additionally, the gas-stream directing nozzle enables to adjust the height of the entering gas stream to be on the same level as the rim of the sample receiving position or as the rim of the sample vessel located in the sample receiving position, should the vessel protrude from the sample receiving position. For example, the gas-stream directing nozzle may be made of flexible material to enable height adjustment. The gas stream's orientation parallel to the sample surface tangent plane and its controlled entry speed support the fast removal of the evaporated solvent while at the same time avoiding splashing of the sample, thus reducing the risk of cross-contamination and unwanted analyte loss. Thereby, two effects come into play: The gas stream moving across the opening of the sample receiving position at a predefined speed and in a direction parallel to the sample surface tangent plane draws adjacent gas layers with it, thereby inducing movement of the gas layers in the sample receiving position that result in a vortex like gas movement above the sample surface. Secondly, it induces a decrease in static pressure on the gas phase above the sample surface according to the Bernoulli principle, thereby increasing the removal efficiency of evaporated gas molecules from the sample surface. Further, the gas stream effectively directs the evaporated sample solvent towards the cavity outlet, thereby cooperating with the vacuum pump in efficiently transporting it to the outside of the sample concentrating unit. "Cooperating" as used herein refers to at least two subunits being operated in a coordinated manner in order to create an additive effect compared to if they would be operated alone. The at least two subunits may thereby be operated simultaneously or in alternating manner. The height alignment of the nozzle leveling it at the height of the rim of the sample receiving position or of the sample vessel in combination with the controlled entry speed causes the gas stream to partially tear off over the rim of the sample receiving position or the rim of the sample vessel, respectively, that is positioned closest to the gas-stream directing nozzle. In particular, the rim of the sample receiving position or of the sample vessel represents an obstruction that causes turbulences in parts of the laminar gas stream. A part of the gas stream continues to flow over the opening in parallel direction to the sample surface tangent plane, whereas another part of the gas stream is diverted by the rim and enters into the sample receiving position, thereby supporting the creation of a gas vortex above the sample surface, which further supports sample solvent evaporation and removal of evaporated sample solvent away from the sample surface. The gas-stream directing nozzle may be directed radially in relation to the vertical central axis of the sample receiving position (pointing towards the central axis) or it may be directed decentrally, in order to achieve the desired shape of the vortex in the cavity above the sample surface.

A "cavity outlet" as used herein refers to an opening enabling a controlled efflux of gas out of the cavity. The cavity outlet may be formed in the cover element, or it may be formed in the element comprising the sample receiving position, or it may be formed partially by both elements. Thus, one end of the cavity outlet is directed towards the cavity while the other end of the cavity outlet is operably connected to a vacuum pump. The diameter of the cavity outlet is thereby dimensioned to enable a gas flow rate sufficient to generate a negative pressure inside the cavity.

The "vacuum pump" as used herein refers to a device configured to create a negative pressure, i.e., a pressure lower than the surrounding pressure, and to remove gas molecules, potentially including gas molecules evaporated from the sample, from the cavity. Such devices are well known in the state of the art and are widely used and will therefore not be described in further detail. If the sample concentrating unit comprises multiple sample receiving positions and multiple cavities, each cavity may be operably connected to a separate vacuum pump in order to create negative pressure in each cavity independently. Or, one or more cavities may share an operable connection to the same vacuum pump. The vacuum pump may be operatively coupled to a condenser for capturing and subsequently discarding the evaporated sample solvent.

The degree of "negative pressure" created in the cavity by the vacuum pump depends on the chosen in-vitro diagnostic test, on the analyte of interest in the sample, and on the sample solvent. The controller controls the vacuum pump to reduce the pressure inside the cavity in order to lower the boiling point of the sample solvent. This allows the sample concentrating unit to bring the sample solvent to the desired evaporation temperature faster and more energy-efficiently. The vacuum pump is further controlled to constantly adjust the negative pressure in the cavity to the changing conditions, e.g., changing sample volume and/or sample temperature during the process of evaporation, in order to keep the sample solvent at its boiling point. The adaptation of the negative pressure may follow a predefined profile or it may be based on feedback control. Consequently, the negative pressure is maintained below atmospheric pressure. During the evaporation procedure, the pressure in the cavity is constantly adjusted according to a predetermined evaporation profile, which is based among others on the solvent's boiling point curve. The pressure is typically set to a value of up to 5% above the target pressure to prevent superheating. In order to create negative pressure in the cavity, the vacuum pump has to compensate the influx of gas into the cavity through the cavity inlet. Thus, efflux of gas out of the cavity requires it to occur at a higher rate than gas influx, until the desired degree of negative pressure has been achieved.

A "controller" as herein used is a programmable logic controller or processor running a computer-readable program provided with instructions to perform operations in accordance with an operation plan. The term can mean central processing units, microprocessors, microcontrollers, reduced instruction circuits (RISC), application specific integrated circuits (ASIC), logic circuits, and any other circuit or processor capable of executing the functions/methods described herein. Regardless of the type of processor, it is configured to execute one or more of the methods described herein.

The controller may be integrated into the in-vitro diagnostic device, may be integrated into a unit or sub-unit of an in-vitro diagnostic device, or may be a separate logic entity in communication with the in-vitro diagnostic device or its units or sub-units via a direct connection, wired or wirelessly, or indirectly over a communications network, wired or wirelessly, such as a wide area network, e.g., the Internet or a Health Care Provider's local area network or intranet, via a network interface device. In some embodiments, the controller might be integral with a data management unit, e.g., implemented on a computing device such as a desktop computer, a laptop, a smartphone, a tablet, PDA, etc., may be comprised by a server computer and/or be distributed/shared across/between a plurality of in-vitro diagnostic devices. Moreover, the systems can include remote devices, servers and cloud-based elements that communicate via wires or wirelessly (e.g., infrared, cellular, Bluetooth®), or a remote PC/server or a cloud-based system. The processor may be also configurable to control the in-vitro diagnostic device in a way that workflow(s) and workflow step(s) are conducted by the in-vitro diagnostic device. In particular, the controller is configured to control the vacuum pump to automatically adjust the negative pressure in the cavity in order to maintain the sample at boiling point until a predetermined level of solvent evaporation is reached.

A "predetermined level of solvent evaporation" as used herein refers to the volume of sample solvent that requires to be evaporated in order to achieve a desired amount of analyte concentration in the remaining sample and to make the sample processable for subsequent analytical procedures. The evaporation volume is determined by the manufacturer in the context of assay development activities and depends on the analyte of interest, on its solubility in the sample solvent, on the sensitivity of the subsequent analytical procedure, and on possible time restraints due to a given time regimen on an in-vitro diagnostic device. The solvent may be evaporated to dryness or it may be partially evaporated. In-house experiments showed that partial evaporation to 20% of the initial sample volume led to up to five times more analyte being transferred to the subsequent analytical procedures compared to non-evaporated samples, resulting in an up to five-fold signal increase. It was further shown that partial evaporation provided a higher analyte yield and higher signal gains and was better reproducible than evaporation to dryness.

According to an embodiment, the sample concentrating unit comprises a pressure gauge for measuring and monitoring the negative pressure generated in the cavity by the vacuum pump wherein the controller is configured to control the vacuum pump to automatically adjust the negative pressure in the cavity in response to the pressure measured by the pressure gauge. Stated differently, the pressure gauge enables a feedback-controlled adjustment of the negative pressure inside the cavity. The pressure gauge might be a mechanical pressure gauge, e.g., a Bourdon-tube gauge, a membrane manometer, or an electronic pressure gauge, e.g., a piezoresistive or capacitive gauge, or the like. The pressure gauge might be installed inside the cavity or in the connection between the cavity outlet and the vacuum pump or it might be part of the vacuum pump. In particular, the pressure gauge transmits pressure recordings to the controller in predefined time intervals to ensure monitoring of pressure status inside the cavity and to enable the controller to control the vacuum pump accordingly.

According to a further embodiment, the sample concentrating unit comprises a gas-temperature-regulating element coupled to the gas channel. Any principle for regulating the gas temperature may be used, that can enable an accurately controllable temperature adjustment of the gas. The gas-temperature-regulating element may be installed anywhere between the gas source and the cavity inlet. Typically, the gas-temperature-regulating element is in direct contact with the gas channel, it may surround it completely, or it may be integrated into the gas channel. The gas-temperature-regulating element may comprise a material(s) with high thermal conductivity. For example, it may comprise a liquid heat exchanger or a metallic resistance heating element like a heating wire or a heating coil or it may comprise a thermoelectric heating element, like a Peltier element.

The higher the temperature difference is between the inside of the cavity and the gas stream entering the cavity, the greater the effect counteracting evaporation is, e.g., through cooling, and the more likely it is that the gas phases do not mix homogeneously. Consequently, uncontrolled turbulences may occur inside the cavity, which reduce the efficacy of the sample solvent evaporation process. The gas temperature is adjusted to be within a range of +/−10° C. of the temperature inside the cavity. In particular, the gas temperature in the gas channel is brought within a range of 0 to +10° C. of the boiling temperature of the present sample to prevent the sample from cooling and at the same time prevent superheating. The equalization of the gas temperature in the gas channel to the gas temperature in the cavity before mixing further prevents uncontrolled turbulences from occurring.

The controller is configured to control the gas-temperature-regulating element to automatically adjust the gas temperature. The temperature adjustment may follow a fixed operating profile or it may be feedback controlled. For example, in a fixed operating profile, the gas-temperature-regulating element may be switched to a heating state for a predetermined amount of time and then be switched to a non-heating state for a predetermined amount of time, wherein these steps may be repeated 1 to n times, depending on the selected operating profile. Switching the gas-temperature-regulating element into a heating state or into a non-heating state is thus conducted independently from the actual gas stream temperature in the gas channel or the gas temperature in the cavity. Alternatively, in a feedback controlled temperature adjustment, the actual gas stream temperature is monitored and when moving above or below a predetermined temperature range, the gas-temperature-regulating element would be switched to a heating state or to a non-heating state, respectively, to bring the gas stream temperature back into the predetermined temperature range. In this case, the gas-temperature-regulating element comprises a thermometer for monitoring the gas stream temperature.

According to an embodiment, the sample concentrating unit comprises a gas-volume-regulating valve wherein the controller is configured to control the gas-volume-regulating valve to automatically adjust the gas volume entering the cavity. The "gas-volume-regulating valve" as used herein, may be integrated into the gas channel or it may be part of the gas source. Typically, the gas-volume-regulating valve regulates the volume of gas flowing through the gas channel into the cavity in a given period of time by closing, opening, or partially obstructing the gas channel. The volume of gas entering the cavity directly influences the creation of a jet stream by the gas-stream directing nozzle and the creation of a negative pressure inside the cavity. The controller therefore controls the gas-volume-regulating valve in coordination with the gas-stream directing nozzle and the vacuum pump.

According to an embodiment, the sample concentrating unit comprises at least one sample-temperature-regulating element wherein the controller is configured to control the sample-temperature-regulating element to automatically adjust the sample temperature. In general, the "sample-temperature-regulating element" transfers heat directly or indirectly to or from the sample in the sample receiving position. It may be in direct contact with the sample or the sample vessel for optimal heat exchange or it may transfer heat via the sample receiving element or via the gas surrounding the sample (e.g., a temperature-regulated air stream) to the sample receiving position.

The temperature adjustment may follow a fixed operating profile and/or it may be feedback controlled. For example, in a fixed operating profile, the sample-temperature-regulating element may be switched to a heating state for a predetermined amount of time and then be switched to a non-heating state for a predetermined amount of time, wherein these steps may be repeated 1 to n times if necessary, independent of the actual sample temperature. Alternatively, the actual sample temperature or the temperature of the sample receiving element may be monitored to enable a more adequate and real-time temperature adjustment, e.g., with an infrared thermometer. The operating profile is based on the sample solvent and on the sample volume and designed in a way that the sample temperature is maintained at boiling temperature during the evaporation process. The sample-temperature-regulating element may comprise, e.g., a metallic resistance heating element like a heating wire or a heating coil or it may comprise a thermoelectric heating element, like a Peltier element, or it may comprise a thick film heater or it may comprise a laser heater. The sample-temperature-regulating element may be operatively coupled to the sample receiving element and/or the sample receiving position and/or the cover element.

According to an embodiment, the gas-stream directing nozzle is automatically adjustable in diameter or automatically exchangeable with another gas-stream directing nozzle having a different diameter. As mentioned earlier, the operational conditions of an in-vitro diagnostic device have to be quickly adapted based on the selected in-vitro diagnostic test, especially when following a random access approach. Since the diameter of the gas-stream directing nozzle affects the characteristics of the gas-stream entering the cavity (velocity, laminar vs. turbulent flow, etc.), the gas-stream directing nozzle may be constructed in a way that its diameter is adjustable depending on the selected in-vitro diagnostic test. In case of a tapered gas-stream directing nozzle, the diameter referred to herein is the diameter of the orifice facing the cavity. Adjusting the gas-stream directing nozzle's diameter either refers to mechanically reducing or enlarging the cross-sectional area of the nozzle itself, according to mechanisms known by the person skilled in the art. Or, it refers to exchanging the gas-stream directing nozzle with another gas-stream directing nozzle comprising a different diameter. For example, multiple gas-stream directing nozzles, each with a different diameter, may be mounted to a cylindrical rotary means. Based on the selected in-vitro diagnostic test, the cylindrical rotary means moves into a position so that the appropriate gas-stream directing nozzle is located at the transition point between the cavity inlet and the cavity.

In another embodiment, the sample concentrating unit comprises a plurality of sample receiving positions and a respective gas-stream directing nozzle for each of the sample receiving positions, wherein each gas-stream directing nozzle has a different diameter. The gas-stream directing nozzles are arranged so that they do not interfere with each other, i.e., they might partially or entirely be separated from one another by separating members arranged between the sample receiving positions. Depending on the selected in-vitro diagnostic test, the sample is placed into the sample receiving position allocated to the gas-stream directing nozzle with the appropriate diameter.

According to an embodiment, the controller is configured to adjust the negative pressure and/or the gas temperature and/or the gas volume and/or the sample temperature and/or the stream of gas according to a predetermined evaporation profile based on the type of analyte(s) in the sample and/or on the type of solvent and/or on the initial sample volume and/or on the predetermined level of sample solvent evaporation in order to take into account a change in sample volume and concentration during evaporation. The "evaporation profile" as used herein is predetermined during manufacturer's development. The evaporation profile thereby comprises instructions on how the controller coordinates the operation of the above-mentioned functional sub-units in order to bring the sample to its boiling point in a fast and reliable manner, to maintain the sample at its boiling point until the predetermined level of solvent evaporation is reached, while at the same time preventing the sample from possible superheating or bumping, as well as to phase down the functional subunits once the evaporation procedure is completed. The above-mentioned parameters may be monitored to provide the controller with real-time status information and thus enable fast adjustments. Additionally, the sample volume may be monitored during the evaporation procedure, e.g., by an optical liquid level detector, enabling the controller to adjust the operation of the sub-units in real-time in response to the available sample volume.

According to an embodiment, the cover element is automatically removable from the sample receiving position for automatic insertion of the sample and/or the sample vessel into the sample receiving position or removal of the sample and/or the sample vessel from the sample receiving position. There are different options of transporting samples from one interaction position to another on an in-vitro diagnostic device, an interaction position being, e.g., a mixing position, a handover position, an incubation position, a vortexing position, a measuring position, etc. Typically, a sample is aspirated by a pipette and moved—within the pipette—to a next interaction position where the sample is then dispensed. In such a setup, the interaction positions need to be accessible for the pipette in order to either aspirate or dispense sample material. In the present sample concentrating unit, the cover element can be moved automatically away from the sample receiving position to allow the pipette to access the sample receiving position. The cover element may be moveable in a translational or in a rotational manner, wherein the rotational movement may refer to either a horizontal rotation around, e.g., a bolt, or to the rotation of a hinge thereby flipping the cover element away from the sample receiving position.

According to an embodiment, the cavity outlet is arranged opposite of the gas-stream directing nozzle or in the cover element above the sample or sample vessel at an angle of about 90° with respect to the gas-stream directing nozzle. In particular, the cavity outlet is arranged at about the same height as the gas-stream directing nozzle with respect to the sample surface. The arrangement of the cavity outlet opposite the gas-stream directing nozzle assures that the gas stream entering the cavity through the gas-stream directing nozzle at least partially flows over the sample surface towards the cavity outlet, thereby cooperating with the vacuum pump in removing evaporated sample solvent from above the sample surface according to effects described above. Alternatively, the cavity outlet is arranged at an angle of about 90° with respect to the gas-stream directing nozzle, wherein the cavity outlet does not necessarily have to be arranged centrally above the sample receiving position or sample vessel. This arrangement enables the generation of a vortex above the sample surface that supports removal of evaporated solvent and prevents sample carry-over if the sample concentrating unit comprises two or more sample receiving positions.

An automatic method of concentrating analytes in a sample by evaporation of sample solvent is herein also described. The method comprises placing at least one sample or open sample vessel containing a sample in at least one sample receiving position of a sample receiving element, sealing the at least one sample receiving position by a cover element, wherein the cover element and the at least one sample receiving position and/or the sample vessel are designed to leave a cavity between the cover element and an upper sample surface, generating negative pressure in the cavity by a vacuum pump connected to a cavity outlet, introducing a gas stream into the cavity through a cavity inlet connected to a gas source via a gas channel, the cavity inlet comprising a gas-stream directing nozzle, wherein the gas-stream directing nozzle is arranged such that the generated gas stream is directed into the cavity in a direction parallel to a sample surface tangent plane thereby cooperating with the vacuum pump to transport evaporated sample solvent out of the cavity through the cavity outlet, and controlling the sample concentrating unit to maintain the sample at boiling point until a predetermined level of solvent evaporation is reached.

According to an embodiment, the method comprises automatically adjusting the negative pressure in the cavity by controlling the vacuum pump in response to the pressure measured by a pressure gauge.

According to an embodiment, the method comprises adjusting the gas temperature by controlling a gas-temperature-regulating element coupled to the gas channel.

According to an embodiment, the method comprises adjusting the gas volume by controlling a gas-volume-regulating valve.

According to an embodiment, the method comprises controlling at least one sample-temperature-regulating element for adjusting the temperature of the sample in the sample receiving position.

According to an embodiment, the method comprises adjusting the negative pressure and/or the gas temperature and/or the gas volume and/or the sample temperature and/or the stream of gas according to a predetermined evaporation profile based on the type of analyte(s) in the sample and/or on the type of solvent and/or on the initial sample concentration in order to take into account a change in sample volume and concentration during evaporation.

Other and further objects, features and advantages will appear from the following description of exemplary embodiments in combination with the drawings and the accompanying claims. It is noted that the scope of the claims is defined by the recitations therein and not by the specific discussion of features and advantages set forth in the present description.

FIG. 1 shows schematically an example of a sample concentrating unit 100. The sample concentrating unit 100 comprises a sample receiving element 10 with a sample receiving position 11 having an opening 12 confined by a rim for receiving a sample 1 or an open sample vessel 13 containing a sample 1. The sample vessel 13 comprises a body with an inner space and an opening 14 confined by a rim. The sample 1 in the sample receiving position 11 may have been mixed with sample solvent in a preceding sample preparation step or the sample solvent may have been added to the sample 1 in the sample receiving position 11. In any case, sample 1 as depicted in the embodiment in FIG. 1 comprises sample solvent and has an initial upper sample surface 2 prior to the evaporation procedure. The sample surface tangent plane 3 is indicated by a dotted line.

The sample concentrating unit 100 further comprises a cover element 20. In FIG. 1, the cover element 20 is in a position in which it hermetically seals the sample receiving position 11, i.e., in a closed state, thereby preventing uncontrolled exchange of gas from the sample receiving position 11 with the outside of the sample concentrating unit 100. The cover element 20, the sample receiving element 10, the sample receiving position 11, and the sample vessel 13 are designed in a way that a cavity 30 is created between the cover element 20 and the upper sample surface 2 when sealed. The sample concentrating unit 100 further comprises a cavity outlet 32 formed in the cover element 20 and connected to a vacuum pump 50. The type of vacuum pump 50 is selected based on its efficacy in reliably and reproducibly generating negative pressure in the cavity 30.

During the evaporation procedure the pressure inside the cavity 30 is reduced to the vapor pressure of the present sample 1 at the given temperature, i.e., room temperature, thus lowering the sample's 1 boiling point accordingly. For example, assuming the sample is 100% methanol, the pressure would be reduced to about 16.9 kPa to reach methanol's vapor pressure at room temperature (assumed at 25° C.). In another example, assuming the sample is 100% water, the pressure would be reduced to about 3.17 kPa to reach water's vapor pressure at room temperature. When the pressure reaches the vapor pressure of the sample 1, the sample 1 is at its boiling point.

The sample concentrating unit 100 further comprises a cavity inlet 31 connected to a gas source 40 via a gas channel 41. The cavity inlet 31 comprises a gas-stream directing nozzle 33a for directing a stream of gas into the cavity. The gas-stream directing nozzle 33a as illustrated in FIG. 1 has a tapered shape in order to focus the gas stream, thereby increasing the entry speed of the gas stream into the cavity 30, and is oriented to direct the entering gas stream in a direction parallel (indicated by a solid rightwards arrow in FIG. 1) to the sample surface tangent plane 3. In an embodiment not illustrated in FIG. 1, the gas-stream directing nozzle 33a is adjustable in z-direction. During the evaporation procedure, the parallel gas stream effectively moves evaporated molecules from the opening 14 of the sample vessel 13 towards the cavity outlet 32, thereby cooperating with the vacuum pump 50. In addition, the gas stream partially tears off over the rim of the opening 14 of the sample vessel 13. This leads to a partial gas stream entering into the sample vessel 13, thereby creating a vortex above the sample surface 2, indicated by a dashed arrow in FIG. 1. The vortex further increases the removal rate of evaporated sample solvent away from the upper sample surface 2 and out of the sample vessel 13 (indicated by a dotted arrow in FIG. 1), thus accelerating the evaporation process. The evaporated gas molecules are transported out of the cavity 30 through the cavity outlet 32.

The sample concentrating unit 100 further comprises a controller 60 configured to control the vacuum pump 50 to automatically adjust the negative pressure in the cavity 30 in order to maintain the sample 1 at boiling point until a predetermined level of solvent evaporation is reached. The predetermined level of solvent evaporation is indicated in FIG. 1 as the difference between the initial upper sample surface 2 prior to the evaporation procedure and the final upper sample surface 4 after the evaporation procedure. The negative pressure inside the cavity 30 requires constant adjustment during the evaporation procedure in order to maintain the sample 1 at boiling point. Especially in the case where the sample solvent is a binary mixture, e.g., methanol and water, in which one component evaporates sooner than the other, thereby shifting the concentration from one component to the other and consequently changing the vapor pressure of the sample 1 during the evaporation procedure. Further factors that have an impact on the evaporation conditions during the evaporation procedure and thus require adjustment of the negative pressure in the cavity 30 are: the volume change of the sample 1 during evaporation, i.e., from initial upper sample surface 2 to the final upper sample surface 4, the temperature change of the sample 1 through evaporative cooling caused by the removal of the gas phase above the upper sample surface 2 and 4, and the change of concentration of analytes or other compounds in the sample 1, impacting the intermolecular forces and surface tension in the sample 1. Prior to the evaporation procedure the controller 60 is provided with information on the sample 1 intended for the evaporation procedure, e.g., sample type, initial sample volume, type and volume of added sample solvent, analyte of interest, expected level of solvent evaporation, possible presence of other additives or reagents, etc. Based on these parameters, the controller 60 selects an evaporation profile and controls the vacuum pump 50 to adjust the negative pressure in the cavity 30 accordingly. The controller 60 further controls the gas source 40 to provide gas into the cavity 30 in coordination with the operation of the vacuum pump 50. In an experimental setup without pressure gauge, partial evaporation of water to 20% of the initial volume was achieved in ~3.5 minutes, evaporation to dryness was achieved in ~9 minutes.

Figure 2:
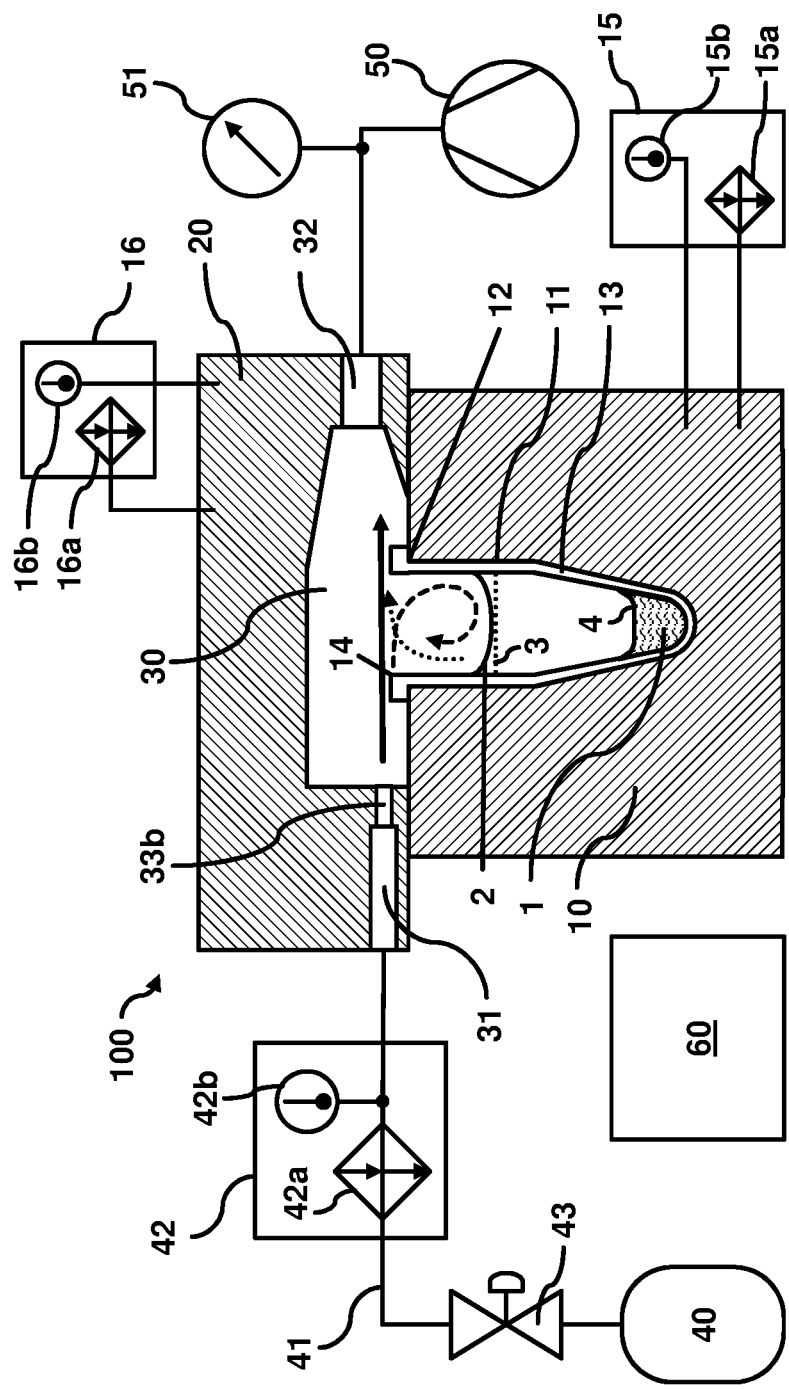
FIG. 2 schematically shows a sample concentrating unit in a lateral cross-section view according to further embodiments comprising additional elements.

FIG. 2 schematically illustrates an example of a sample concentrating unit 100 according to further embodiments of the present disclosure. The sample concentrating unit 100 comprises a pressure gauge 51 coupled to the operative connection between the cavity outlet 32 and the vacuum pump 50 in order to measure and monitor the negative pressure generated by the vacuum pump 50. Instead of being coupled to the connection between the cavity outlet 32 and the vacuum pump 50, the pressure gauge 51 can alternatively be installed in the cavity 20 or be part of the vacuum pump 50. The pressure gauge 51 provides continuous information on the pressure status to the controller 60, which compares said information with an evaporation profile specifically selected for a given sample 1. The controller 60 is configured to control the vacuum pump 50 to automatically adjust the negative pressure in the cavity 20 in response to the pressure measured by the pressure gauge 51 in order to be in accordance with the predetermined evaporation profile.

The sample concentrating unit 100 as illustrated in FIG. 2 further comprises a gas-temperature-regulating element 42 coupled to the gas channel 41. The gas-temperature-regulating element 42 comprises an element for supplying or removing heat to or from the gas stream 42a and a thermometer 42b for monitoring the actual temperature of the gas stream. The controller 60 is configured to control the gas-temperature-regulating element 42 to automatically adjust the gas temperature, thereby bringing it into the required temperature range. Temperature adjustment of the gas stream to the required temperature range would be more precise, if the temperature in the cavity 30 were monitored and fed back to the controller 60 (not illustrated in FIG. 2). The sample concentrating unit 100 further comprises a gas-volume-regulating valve 43 coupled to the gas channel 41. The controller 60 is configured to control the gas-volume-regulating valve 43 to automatically adjust the gas volume entering the cavity 30. A sample solvent with a higher boiling point requires a higher gas flow than a sample solvent with a lower boiling point in order to enable a fast evaporation. For example, in in-house experiments, a gas flow of ~9.8 l/min was used to concentrate an initial volume of 100 microliters of sample down to 20 microliters. The controller 60 thereby coordinates the operation of the gas-volume-regulating valve 43 with the operation of the vacuum pump 50 to enable the creation of negative pressure inside the cavity 30 while at the same time providing an influx of a gas stream into the cavity 30 sufficient to remove evaporated sample solvent away from the upper sample surface 2. Compared to the embodiment as illustrated in FIG. 1, where a pump coupled to the gas source 40 provides gas into the cavity 30, the gas-volume-regulating valve 43 allows the gas volume to be adjusted more precisely and thus allows a faster adaptation to changing conditions inside the sample concentrating unit 100. In further embodiments not illustrated in this disclosure the sample concentrating unit 100 may comprise a gas-temperature-regulating element 42, but no gas-volume-regulating element 43, or it may comprise a gas-volume-regulating element 43, but no gas-temperature-regulating element 42.

The sample concentrating unit 100 as illustrated in FIG. 2 further comprises a sample-temperature-regulating element 15 operatively coupled to the sample receiving element 10 and an auxiliary temperature-regulating element 16 operatively coupled to the cover element 20. The sample-temperature-regulating element 15 and the auxiliary temperature-regulating element 16 comprise elements for supplying or removing heat (15a, 16a), e.g., a Peltier element, and thermometers (15b, 16b) for monitoring the temperature of the sample receiving element 10 and the cover element 20, respectively. The sample-temperature-regulating element 15 supplies heat to or removes heat from the sample 1 indirectly via the sample receiving element 10, which is made of a thermally conductive material, e.g., metal. The auxiliary temperature-regulating element 16 on the other hand supplies heat to the cover element 20 to indirectly provide heat to the sample 1 via the gaseous phase in the cavity 30 and to prevent condensation of the gaseous phase on the cover element 20. Once the evaporation procedure starts, the controller 60 is provided with information on the sample 1, e.g., sample type, initial sample volume, type and volume of added sample solvent, analyte of interest, expected level of solvent evaporation, possible presence of other additives or reagents, etc. Based on these parameters, the controller 60 selects an appropriate evaporation profile and according to said evaporation profile controls the sample-temperature-regulating element 15 to provide heat to the sample 1 via the sample receiving element 10 and controls the auxiliary temperature-regulating element 16 to provide heat to the cover element 20 in coordination with the generation of negative pressure in the cavity 30 by the vacuum pump 50. By creating a negative pressure inside the cavity 30 and at the same time heating the sample 1 in a controlled manner, the boiling point of the sample 1 is achieved faster. Once the predetermined level of solvent evaporation is reached, the controller 60 controls the temperature-regulating elements 15, 16, 42 to stop supplying heat to the sample receiving element or cover element or gas channel, respectively, or alternatively to actively cool the sample receiving element or cover element or the gas channel, respectively, by removing heat from it. Additionally, the controller 60 controls the vacuum pump 50 to cease generating a negative pressure inside the cavity 30 in order to stop the evaporation procedure.

The cavity inlet 31 of the sample concentrating unit 100 as illustrated in FIG. 2 comprises a gas-stream directing nozzle 33*b* for directing a stream of gas into the cavity. The gas-stream directing nozzle 33*b* has a cylindrical shape, wherein its cross-sectional area is smaller than the cross-sectional area of the gas channel 41 in order to focus and increase the entry speed of the gas stream into the cavity 30. The gas-stream directing nozzle 33*b* is fixed installed in the cover element 20 in a position that the gas stream enters the cavity 30 in a direction parallel to the sample surface tangent plane 3 and at the level of the rim 14 of the sample vessel 13 (indicated by the solid arrow). The cavity 30 in FIG. 2 has a tapered shape in a horizontal direction towards the cavity outlet 32 to support directing the gas phase towards the cavity outlet 32 when being removed from the cavity 30.

In an example of an evaporation procedure for a sample 1 that is a serum sample mixed with a sample solvent (mixture of 80% methanol and 20% water), the controller 60 controls the vacuum pump 50 to generate a negative pressure of about 29.7 kPa and at the same time controls the sample-temperature-regulating element 15 to heat the sample to about 39.5° C. in order to reach the sample's boiling point at which mainly the organic compound will evaporate. During evaporation, the conditions will be adjusted in correspondence to the decreasing methanol fraction in the mixture.

Figure 3:
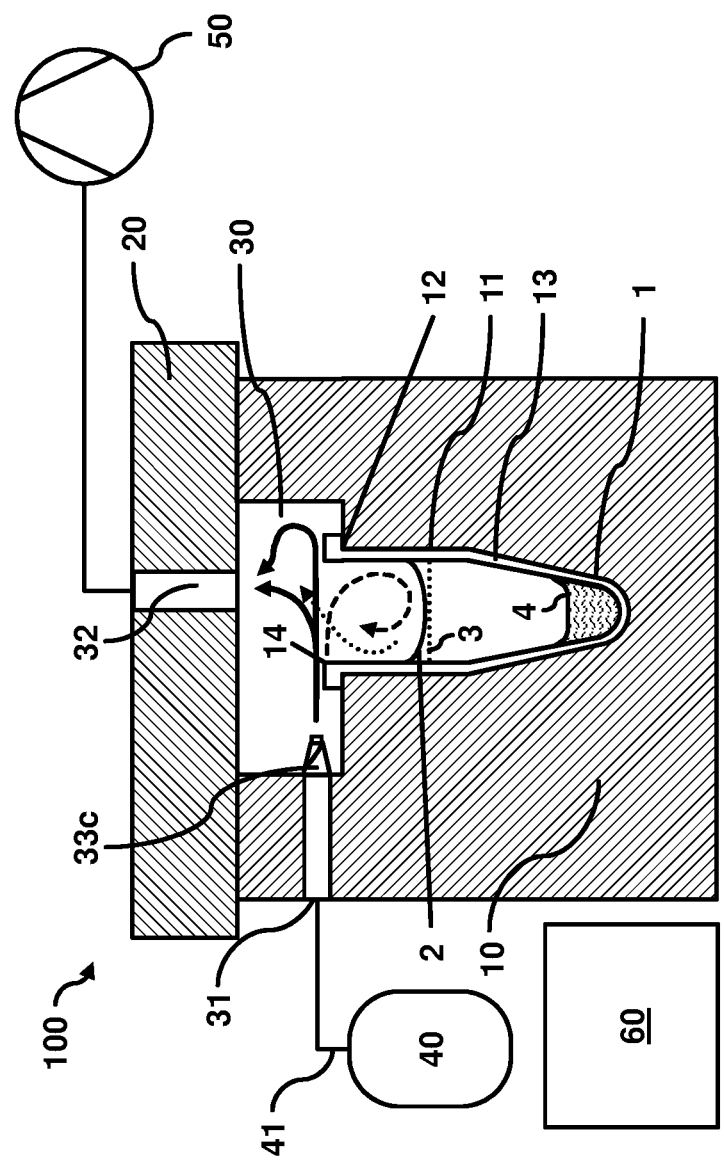
FIG. 3 schematically shows a variation of the embodiment of FIG. 1.

FIG. 3 schematically illustrates an example of a sample concentrating unit 100 according to further embodiments of the present disclosure. In this example, the cover element 20 is positioned in a closed state, i.e., it hermetically seals the sample receiving position 11, thereby forming a cavity 30 between the upper sample surface 2 and the cover element 20. The cavity outlet 32 is formed in the cover element 20 above the sample receiving position 11 at an angle of 90° with respect to the gas-stream directing nozzle 33*c*. The cavity inlet 31 and the gas-stream directing nozzle 33*c* are formed in the sample receiving element 10. The gas-stream directing nozzle 33*c* comprises sheet-metal segments fixed to a rotatable ring, the sheet-metal segments being movable to each other when the ring is rotated, thereby enabling the gas-stream directing nozzle 33*c* to automatically adjust its diameter. Adjustment of the diameter of the gas-stream directing nozzle 33*c* is controlled by the controller 60 and depends on the selected evaporation profile. During the evaporation procedure, the gas stream enters the cavity 30 in a direction parallel to the sample surface tangent plane 3 until it reaches the rim 14 of the sample vessel 13, where the gas stream partially tears off over the rim 14, leading to a partial gas stream entering into the sample vessel 13, thereby creating a vortex above the sample surface 2 (indicated by a dashed arrow in FIG. 3) and a partial gas stream continuing in a direction parallel to the sample surface tangent plane 3 before diverting into the direction of the cavity outlet 32 situated above the sample receiving position 11 (indicated by solid arrows in FIG. 3). Again, the created vortex above the upper sample surface 2 further increases the removal rate of evaporated sample solvent (indicated by a dotted arrow in FIG. 3), thus accelerating the evaporation process. The evaporated sample solvent is transported out of the cavity 30 by the gas stream and the vacuum pump 50 through the cavity outlet 32.

Figure 4:
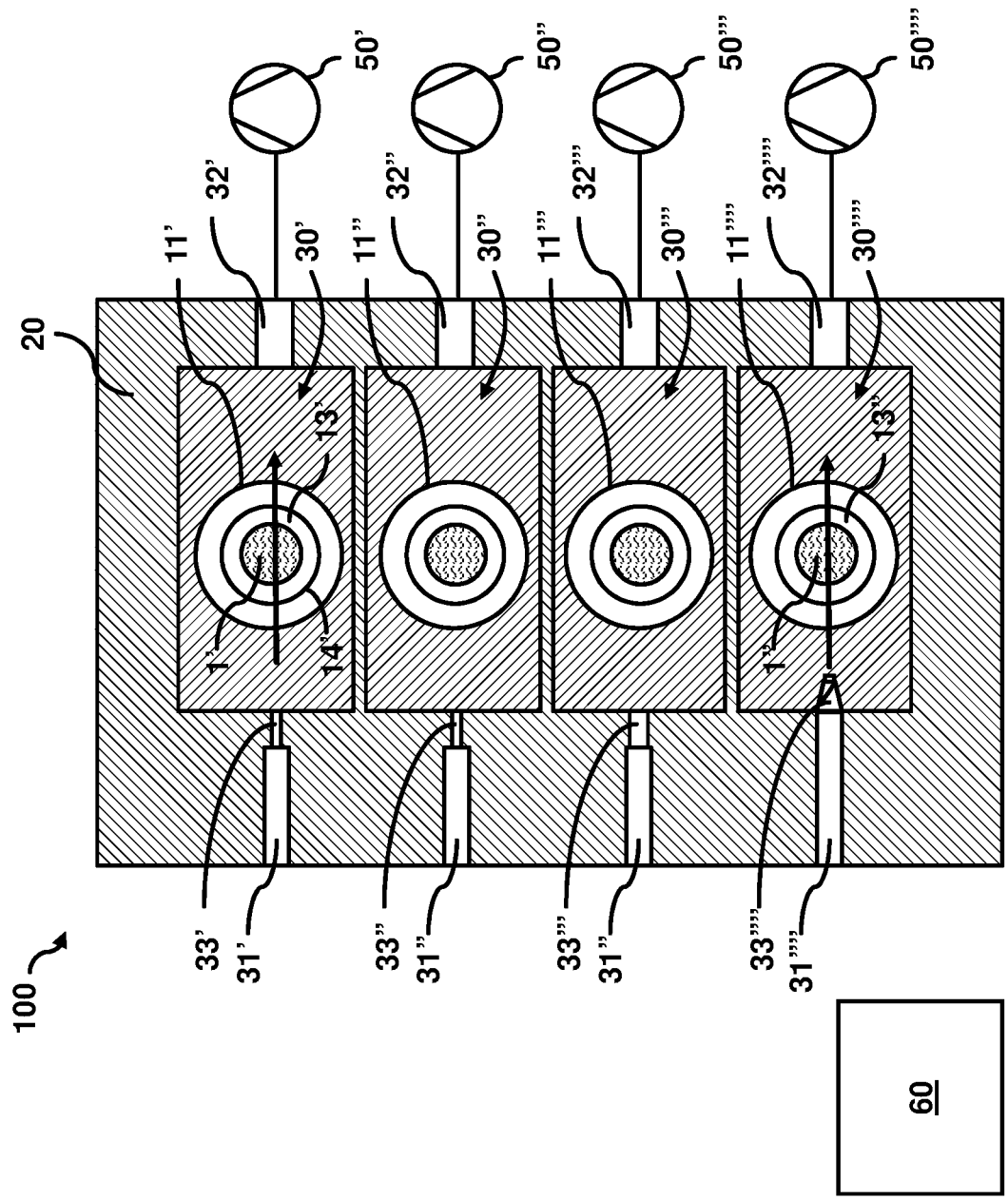
FIG. 4 schematically shows a sample concentrating unit in a cross-section view from above comprising a plurality of sample receiving positions.

FIG. 4 schematically illustrates an example of a sample concentrating unit 100 in a cross section view from above. The sample concentrating unit 100 comprises four sample receiving positions (10', 10", 10''', 10''''). The sample concentrating unit 100 comprises a cover element 20 that hermetically seals the sample receiving positions (11', 11", 11''', 11''''). The cross section view reveals four cavities (30', 30", 30''', 30''''). Four cavity outlets (32', 32", 32''', 32'''') are formed in the cover element 20 in correspondence with each sample receiving position (11', 11", 11''', 11'''') and operatively connected to vacuum pumps (50', 50", 50''', 50''''). Further, four cavity inlets (31', 31", 31''', 31'''') are formed in the cover element 20 in correspondence with each sample receiving position (11', 11", 11''', 11''''), each cavity inlet (31', 31", 31''', 31'''') comprising a gas-stream directing nozzle (33', 33", 33''', 33''''). Gas-stream directing nozzles 33', 33", 33''' have fixed diameters, wherein the diameters of the gas-stream directing nozzles 33' and 33" are the same, but different from the diameter of gas-stream directing nozzle 33'''. Gas-stream directing nozzle 33'''' has an adjustable diameter. The gas-stream directing nozzles (33', 33", 33''', 33'''') are directed radially in relation to the vertical central axis of the sample receiving positions (11', 11", 11''', 11'''') (pointing towards the central axis). Prior to the evaporation procedure, the controller 60 is provided with information on a sample (1', 1") intended for evaporation, based on which the controller 60 selects an appropriate predetermined evaporation profile. The controller 60 controls the placement of the sample (1', 1") into one of the sample receiving positions (11', 11", 11''', 11'''') in correspondence with the evaporation profile.

For example, the controller 60 receives instructions to perform a diagnostic test on a sample 1' to detect an analyte of interest that requires no addition of sample solvent for its extraction. The test application nonetheless requires that a certain volume of the liquid component of sample 1', e.g., water, be evaporated in order to concentrate the analyte of interest. The corresponding evaporation profile determines the conditions under which the evaporation needs to occur. Thus, the controller 60 controls the vessel 13' containing the sample 1' to be placed into the sample receiving position 11', because said sample receiving position 11' and its corresponding cavity inlet 31', the diameter of the gas-stream directing nozzle 33' and the vacuum pump 50' have been adjusted for this type of evaporation profile. Once the sample vessel 13' has been placed in the sample receiving position 11', the controller 60 controls the respective sub-units to initiate the evaporation procedure in accordance with the evaporation profile. In particular, the vacuum pump 50' generates negative pressure in the cavity 30' in coordination with the gas-stream directing nozzle 33' that introduces a stream of gas into the cavity 30' (indicated by a solid rightwards arrow in FIG. 4), which supports the removal of the evaporated liquid component of the sample 1', as previously described.

In another example, the controller 60 receives instructions to perform a diagnostic test to detect an analyte of interest, e.g., testosterone, in a sample 1" that requires addition of a certain volume of sample solvent (e.g., mix of methanol and water in a relation of 80% to 20%). The test application for testosterone requires evaporation of a certain volume of sample solvent in order to concentrate the analyte of interest prior to liquid chromatography. The corresponding evaporation profile for testosterone determines the evaporation conditions. According to the evaporation profile, the controller 60 controls the vessel 13" containing the sample 1" to be placed into the sample receiving position 11'''' and controls the corresponding gas-stream directing nozzle 33'''' to adjust its diameter accordingly. In order to maximize throughput, the controller 60 aims at having as many sample receiving positions (11', 11", 11''', 11'''') as possible in use during an evaporation cycle.

FIG. 5a schematically illustrates a section of a sample concentrating unit 100 in a cross section view from above according to further embodiments. FIG. 5b schematically illustrates the same sample concentrating unit 100 in a lateral cross section view. In difference to the example in FIG. 4, the sample concentrating unit 100 comprises a gas-stream directing nozzle 33 that is directed decentrally towards the sample receiving positions 11 (indicated by the solid rightwards arrow in FIG. 5a). The decentral arrangement causes a corkscrew-shaped vortex, which is generated above the upper sample surface 2 of the sample 1 when a part of the gas stream tears off over the rim 14 of the sample vessel 13 and enters into the sample vessel 13 (indicated by the dashed arrow in FIGS. 5a and 5b), supporting the removal of evaporated sample solvent away from the upper sample surface 2 (indicated by the dotted arrow in FIG. 5b).

In the preceding specification, devices and methods according to various embodiments are described in detail. The devices and methods may be embodied in many different forms and should not be construed as limited to the embodiments set forth and illustrated herein. It is therefore to be understood that the devices and methods are not to be limited to the specific embodiments disclosed and that modifications and other embodiments are intended to be included within the scope of the appended claims. Although specific terms are employed herein, they are used in a generic and descriptive sense only and not for purposes of limitation. Unless defined otherwise, all technical and scientific terms used herein have the same meaning as commonly understood by one skilled in the art to which the disclosure pertains. Although any methods and materials similar to or equivalent to those described herein can be used in the practice or testing of the methods, the preferred methods and materials are described herein.

Moreover, reference to an element by the indefinite article "a" or "an" does not exclude the possibility that more than one element is present, unless the context clearly requires that there be one and only one element. The indefinite article "a" or "an" thus usually means "at least one." Likewise, the terms "have," "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. For example, the expressions "A has B," "A comprises B" and "A includes B" may refer both to a situation in which, besides B, no other element is present in A (i.e., a situation in which A solely and exclusively consists of B) or to a situation in which, besides B, one or more further elements are present in A, such as element C, elements C and D, or even further elements.

Also, reference throughout the specification to "one embodiment", "an embodiment", "one example" or "an example", means that a particular feature, structure or characteristic described in connection with the embodiment or example is included in at least one embodiment. Thus, appearances of the phrases "in one embodiment", "in an embodiment", "one example" or "an example", in various places throughout this specification are not necessarily all referring to the same embodiment or example.

Furthermore, the particular features, structures, or characteristics may be combined in any suitable combinations and/or sub-combinations in one or more embodiments or examples, especially but not limited to the various forms and positions of the gas-stream directing nozzles.

What is claimed is:

1. A sample concentrating unit for concentrating analytes in a sample by evaporation of sample solvent comprising:
   a sample receiving element with at least one sample receiving position having one opening confined by one rim for receiving a sample or an open sample vessel containing a sample, wherein the open sample vessel comprises a body with an inner space adapted to receive liquids and another opening confined by another rim through which liquids may be introduced into the inner space;
   a cover element for sealing the at least one sample receiving position, wherein the cover element and the at least one sample receiving position and/or the sample vessel are designed to leave a cavity between the cover element and an upper sample surface;
   the sample concentrating unit further comprising
   a cavity inlet connected to a gas source via a gas channel and comprising a gas-stream directing nozzle for directing a stream of gas into the cavity;
   a cavity outlet connected to a vacuum pump for generating negative pressure in the cavity;
   wherein the gas-stream directing nozzle is arranged such that the gas stream enters the cavity in a direction parallel to a plane tangent to the upper sample surface and on the same level as the one rim or the another rim, and the gas stream contacts the one rim or the another rim while traveling in the direction parallel to the plane tangent to the upper sample surface, thereby cooperating with the vacuum pump to transport evaporated sample solvent out of the cavity through the cavity outlet, and
   a controller configured to control the vacuum pump to automatically adjust the negative pressure in the cavity in order to maintain the sample at boiling point until a predetermined level of sample solvent evaporation is reached.

2. The sample concentrating unit according to claim 1 further comprising a pressure gauge for measuring and monitoring the negative pressure generated in the cavity by the vacuum pump wherein the controller is configured to control the vacuum pump to automatically adjust the negative pressure in the cavity in response to the pressure measured by the pressure gauge.

3. The sample concentrating unit according to claim 1 further comprising a gas-temperature-regulating element coupled to the gas channel wherein the controller is configured to control the gas-temperature-regulating element to automatically adjust the gas temperature and/or comprising a gas-volume-regulating valve wherein the controller is configured to control the gas-volume-regulating valve to automatically adjust the gas volume entering the cavity, and wherein the gas-temperature-regulating element includes a thermometer.

4. The sample concentrating unit according to claim 1 further comprising at least one sample-temperature-regulating element wherein the controller is configured to control the sample-temperature-regulating element to automatically adjust the sample temperature in the sample receiving position, and wherein the at least one sample-temperature-regulating element includes at least one thermometer.

5. The sample concentrating unit according to claim 1 wherein the gas-stream directing nozzle is automatically adjustable in diameter or exchangeable with another gas-stream directing nozzle having a different diameter.

6. The sample concentrating unit according to claim 1 further comprising a plurality of sample receiving positions and a respective gas-stream directing nozzle for each of the sample receiving positions, wherein each gas-stream directing nozzle has a different diameter.

7. The sample concentrating unit according to claim 1 wherein the controller is configured to adjust the negative pressure and/or the gas temperature and/or the gas volume and/or the sample temperature and/or the stream of gas according to a predetermined evaporation profile based on the analyte(s) in the sample and/or on the solvent and/or on the initial sample volume and/or on the predetermined level of sample solvent evaporation in order to take into account a change in sample volume and concentration during solvent evaporation.

8. The sample concentrating unit according to claim 1 wherein the cover element is automatically removable from the sample receiving position for automatic insertion of the sample and/or the sample vessel into the sample receiving position or removal of the sample and/or the sample vessel from the sample receiving position.

9. The sample concentrating unit according to claim 1 wherein the cavity outlet is arranged opposite with respect to the gas-stream directing nozzle or in the cover element above the sample receiving position at an angle of about 90° with respect to the gas-stream directing nozzle.

10. An automatic method of concentrating analytes in a sample by evaporation of sample solvent comprising:
  placing at least one sample or open sample vessel containing a sample in at least one sample receiving position of a sample receiving element, wherein the sample receiving element has one opening confined by one rim for receiving a sample, and wherein the open sample vessel comprises a body with an inner space adapted to receive liquids and another opening confined by another rim through which liquids may be introduced into the inner space;
  sealing the at least one sample receiving position by a cover element, wherein the cover element and the at least one sample receiving position and/or the sample vessel are designed to leave a cavity between the cover element and an upper sample surface;
  generating negative pressure in the cavity by a vacuum pump connected to a cavity outlet;
  introducing a gas stream into the cavity through a cavity inlet connected to a gas source via a gas channel, the cavity inlet comprising a gas-stream directing nozzle, wherein the gas-stream directing nozzle is arranged such that the generated gas stream is directed into the cavity in a direction parallel to a plane tangent to the upper sample surface and on the same level as the one rim or the another rim, and the gas stream contacts the one rim or the another rim while traveling in the direction parallel to the plane tangent to the upper sample surface, thereby cooperating with the vacuum pump to transport evaporated sample solvent out of the cavity through the cavity outlet; and
  controlling the sample concentrating unit to maintain the sample at boiling point until a predetermined level of solvent evaporation is reached.

11. The method according to claim 10 further comprising automatically adjusting the negative pressure in the cavity by controlling the vacuum pump in response to the pressure measured by a pressure gauge.

12. The method according to claim 10 further comprising adjusting the gas temperature by controlling a gas-temperature-regulating element coupled to the gas channel, wherein the gas-temperature-regulating element includes a thermometer.

13. The method according to claim 10 further comprising adjusting the gas volume by controlling a gas-volume-regulating valve.

14. The method according to claim 10 further comprising controlling at least one sample-temperature-regulating element for adjusting the temperature of the sample in the sample receiving position, wherein the at least one sample-temperature-regulating element includes at least one thermometer.

15. The method according to claim 10 further comprising adjusting the negative pressure and/or the gas temperature and/or the gas volume and/or the sample temperature and/or the stream of gas according to a predetermined evaporation profile based on the analyte(s) in the sample and/or on the solvent and/or on the initial sample volume and/or on the predetermined level of sample solvent evaporation in order to take into account a change in sample volume and concentration during solvent evaporation.

* * * * *